(12) United States Patent
Courcier et al.

(10) Patent No.: US 10,288,241 B2
(45) Date of Patent: May 14, 2019

(54) VEHICLE HEADLIGHT WITH LED SOURCE AND LASER SOURCE BRIGHTER THAN THE LED SOURCE

(71) Applicant: VALEO VISION, Bobigny (FR)

(72) Inventors: Marine Courcier, Paris (FR); Vanesa Sanchez, Bois Colombes (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/516,167

(22) PCT Filed: Oct. 2, 2015

(86) PCT No.: PCT/EP2015/072858
§ 371 (c)(1),
(2) Date: Mar. 31, 2017

(87) PCT Pub. No.: WO2016/050970
PCT Pub. Date: Apr. 7, 2016

(65) Prior Publication Data
US 2017/0307162 A1    Oct. 26, 2017

(30) Foreign Application Priority Data
Oct. 2, 2014   (FR) .................................... 14 59454

(51) Int. Cl.
| | |
|---|---|
| *B60Q 1/04* | (2006.01) |
| *F21S 41/141* | (2018.01) |
| *F21S 41/663* | (2018.01) |
| *F21S 41/36* | (2018.01) |

(Continued)

(52) U.S. Cl.
CPC .............. *F21S 41/141* (2018.01); *B60Q 1/14* (2013.01); *F21S 41/36* (2018.01); *F21S 41/663* (2018.01); *F21S 43/00* (2018.01)

(58) Field of Classification Search
CPC .......... F21S 41/18; F21S 41/14; F21S 41/141; F21S 41/16; F21S 41/663; B60Q 1/14
See application file for complete search history.

(56) References Cited

U.S. PATENT DOCUMENTS

| | | | |
|---|---|---|---|
| 9,108,568 B2* | 8/2015 | Takahira | F21S 41/16 |
| 9,200,780 B2* | 12/2015 | Suckling | F21S 41/16 |
| 9,243,768 B2* | 1/2016 | Minami | F21S 41/16 |

(Continued)

FOREIGN PATENT DOCUMENTS

| | | |
|---|---|---|
| DE | 10 2008 044 968 A1 | 7/2009 |
| JP | 2014-168985 A | 9/2014 |
| WO | 2014/037320 A1 | 3/2014 |

OTHER PUBLICATIONS

International Search Report dated Dec. 14, 2015 in PCT/EP2015/072858 filed Oct. 2, 2015.

(Continued)

*Primary Examiner* — Ismael Negron
(74) *Attorney, Agent, or Firm* — Oblon, McClelland, Maier & Neustadt, L.L.P.

(57) ABSTRACT

A lighting system including at least two light sources each producing a corresponding illuminated area, and optical means arranged to form a rectangurlarly-shaped light strip from the light emitted by each light source. The at least two light sources include at least one laser and one light emitting diode, the laser being between 2 to 10 times as bright as the light emitting diode.

19 Claims, 3 Drawing Sheets

Figure 2:
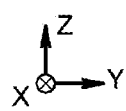

(51) Int. Cl.
*F21S 43/00* (2018.01)
*B60Q 1/14* (2006.01)

(56) References Cited

U.S. PATENT DOCUMENTS

| | | | |
|---|---|---|---|
| 2011/0026266 A1 | 2/2011 | Sasaki et al. | |
| 2013/0021810 A1 | 1/2013 | Funk et al. | |
| 2013/0027951 A1* | 1/2013 | Takahashi | F21S 41/18 |
| | | | 362/465 |
| 2013/0235601 A1* | 9/2013 | Takahashi | F21S 41/16 |
| | | | 362/465 |
| 2014/0043843 A1 | 2/2014 | Moser et al. | |
| 2015/0260364 A1 | 9/2015 | Kliebisch | |
| 2017/0232882 A1* | 8/2017 | Mochizuki | F21S 41/16 |
| | | | 362/516 |
| 2017/0307166 A1* | 10/2017 | Courcier | F21S 41/16 |

OTHER PUBLICATIONS

French Search Report dated Jun. 26, 2015 in FR1459454 filed Oct. 2, 2014.

* cited by examiner

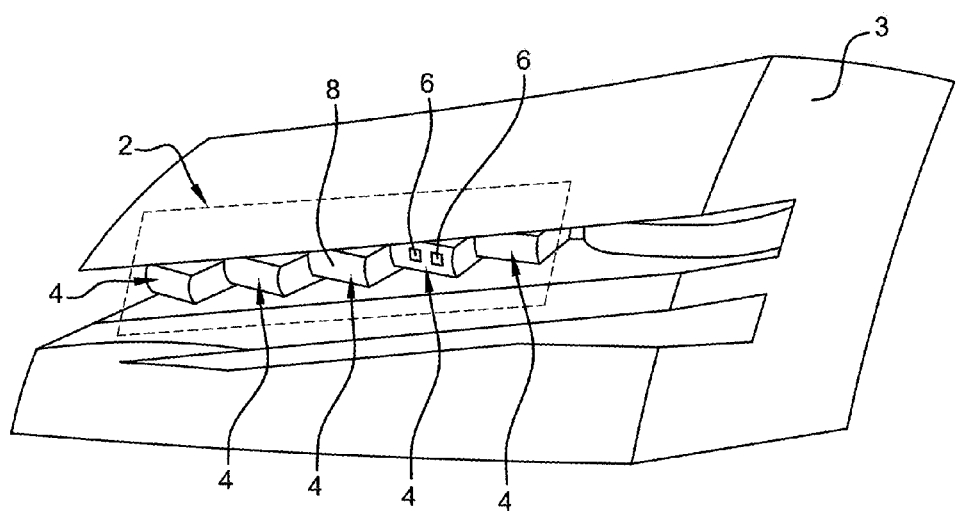
Fig. 1
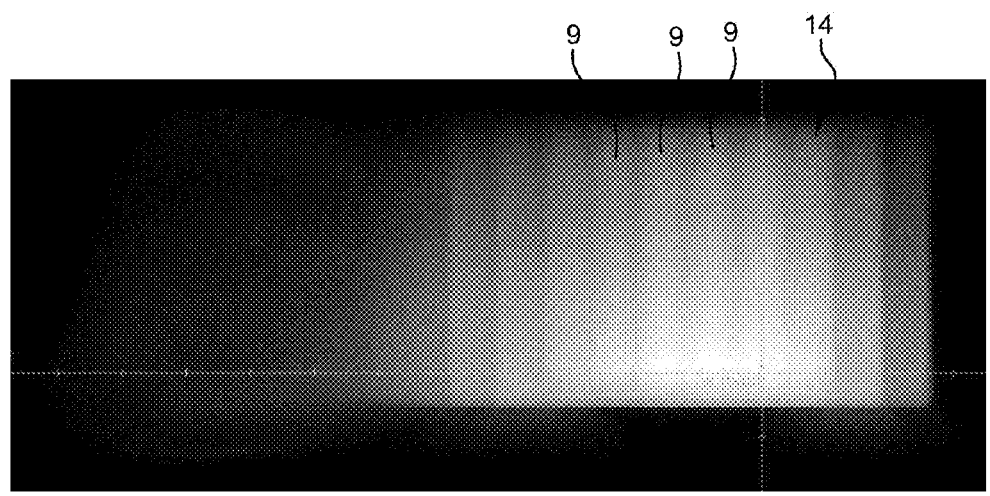

VEHICLE HEADLIGHT WITH LED SOURCE AND LASER SOURCE BRIGHTER THAN THE LED SOURCE

The invention concerns a lighting system such as a headlight for a motor vehicle.

It is known to provide on a motor vehicle diverse "high beam" lighting functions and a second, "low beam" function. The first function illuminates the entire width of the road in front of the vehicle. The second function illuminates the lane in which the vehicle is located and moderately illuminations the alongside lane in which there may be vehicles traveling in the opposite direction, in order to limit the risk of dazzling. However, it is generally required that the second lighting function limit even further the risks of dazzling the driver of a vehicle traveling in an adjacent lane. There has therefore been proposed in the prior art an adaptive lighting function that makes it possible to illuminate at a great distance and selectively and dynamically not to illuminate some parts of the scene situated in front of the vehicle and in particular vehicles traveling in the adjacent lane. To this end, an observation device analyzes the scene and selects the zones that must not be illuminated.

To this end, it is notably known to divide this scene into a plurality of imaginary vertical rectangular strips that are selectively illuminated according to the parts that it is wished to illuminate (the same type of operation can be implemented with a matrix layout, i.e. one of rows and columns, of the different zones of the scene to be selectively illuminated). A system of this kind is adapted to produce a selective light beam formed by juxtaposed rectangular strips of light. A lighting system adapted to form a rectangular strip of light is described in the document EP-2 278 217, for example.

The choice of light sources equipping a system of this kind is subject to various constraints, notably compliance with specifications drawn up by the manufacturer of the vehicle. Those specifications generally include a styling requirement imposing maximum dimensions for the lighting system and thus for the optical means intended to generate the strips of light, together with an ideal profile of the luminous intensity of the beam as a function of the horizontal angle measured between the direction of emission of a ray of the light beam concerned and the direction of movement of the vehicle. Compliance with the specifications implies that the intensity profile of the light beam actually generated by the lighting system is greater than or equal to the ideal profile. The ideal profile has the approximate shape of a bell curve in most cases.

In order to comply with this constraint, one immediate solution is to choose all the light sources of high brightness able to form light spots of high luminous intensity. If all the light sources are supplied with power at their nominal current, the light beam then has a rectangular luminous intensity profile inside which the ideal profile is inscribed. However, in this solution, the installed power in the lighting system, defined as being the luminous power generated in the beam if all the light sources are supplied with power at their nominal current, is excessively high. Now, light sources of high brightness are generally more costly than those of moderate brightness. This means that the ratings of the lighting systems are stepped up in vain, which is therefore not the optimum, and that the production cost of a system of this kind is increased to no benefit.

Moreover, a rectangular profile of this kind generates a very high brightness contrast at the lateral edges of the beam, which impedes the driver's view of the scene. In fact, in this case, at the lateral edges of the beam the luminous intensity changes suddenly from a very high value to a virtually nil value over a small angular range. To alleviate this problem, the light sources intended to form the light spots at the edges of the beam can be supplied with power by a current significantly lower than the nominal current, with the result that the contrast is reduced and the luminous intensity transitions are less abrupt. This generates a drop in the efficiency of use of the system, however, which is defined as being the ratio of the luminous power generated by the beam to the installed power. It is in fact beneficial to supply a maximum number of light sources with power by a current as close as possible to their nominal current. Moreover, the above solution is not able to solve the problem of the ratings of the lighting system being increased with no benefit.

It might then be envisaged to require all the light sources to be of the moderate brightness type, such as light-emitting diodes. However, this is not a sufficient condition for compliance with the specifications, in particular if the dimensions of the optical means associated with the light sources are limited by styling concerns or if the ideal intensity profile to be achieved is too high. This solution is therefore unsatisfactory.

An object of the invention is to form a selective beam by means of a lighting system the efficiency of use of which is as high as possible, the profile of the beam always corresponding at least to the imposed ideal profile.

To this end, the invention provides a motor vehicle lighting system for emitting a light beam comprising at least two illuminated zones each generated by at least one light source and optical means adapted to form a light spot from the light emitted by the light source, each spot having the general shape of a strip of light, notably of rectangular general shape, characterized in that it includes at least two types of light source, termed first and second light source types, the light sources of the same type having substantially the same brightness, and the brightness of a light source of the first type being 2 to 10 times greater than that of a light source of the second type.

The system including two types of light source with significantly different brightnesses, light sources of low brightness can therefore be used in the zones where the required luminous intensity is relatively low and light sources of high brightness used in the zone where the required luminous intensity is higher. This makes it possible to reduce the installed power of the lighting system at the same time as complying with the ideal profile set out in the specifications. Moreover, a greater number of light sources function at a current closer to their nominal current compared to a system including only light sources of high brightness. This increases the efficiency of use of the system.

The brightness of a light source of the first type is advantageously 3 to 5 times greater than that of a light source of the second type.

This brightness ratio between the two types of light source makes it possible to obtain a particularly optimum intensity profile of the light beam.

The light spots are advantageously all of substantially identical shape and substantially parallel to a common principal direction.

The light beam therefore has a rectangular general shape and is divided into substantially parallel rectangular strips. It is therefore easy to control the extinction of the light sources forming the light spots covering the zones that are not to be illuminated.

The light spots are preferably partly superposed.

This increases the luminous intensity and the homogeneity that can be imparted to the beam with imposed light sources. It also improves the resolution of the light beam, that is to say the smallest size of light beam zone the extinction of which is controlled, which makes it possible to improve the dynamic extinction of the zones of the scene that are not to be illuminated.

Two consecutive light spots of the light beam are preferably superposed over half the width of the light spots.

A wide zone of the beam is therefore defined in which at any point two light spots are superposed to increase the intensity of the light beam.

The beam advantageously includes at least one zone in which it consists of a regular alternation of spots formed by sources of the first type and spots formed by sources of the second type.

This creates a zone of the light beam in which the intensity is lower than that of the light spots formed by the light sources of the first type and higher than that of the light spots formed by the light sources of the second type. This makes it possible to reduce further the installed power of the lighting system at the same time as complying with the ideal profile set out in the specifications.

The light sources of the first type are advantageously laser diodes.

The light sources of the second type are advantageously light-emitting diodes.

These light sources make it possible to form the two types of light source complying with the brightness difference defined above.

The beam advantageously includes, at one of its two lateral edges at least, an extended light spot of greater width than the other light spots.

This extended light spot forms a zone of the beam whose intensity does not usually need to be adjusted. This therefore limits the number of light sources that the lighting system must include, which makes it possible to reduce the production cost of the system.

Figure 3:
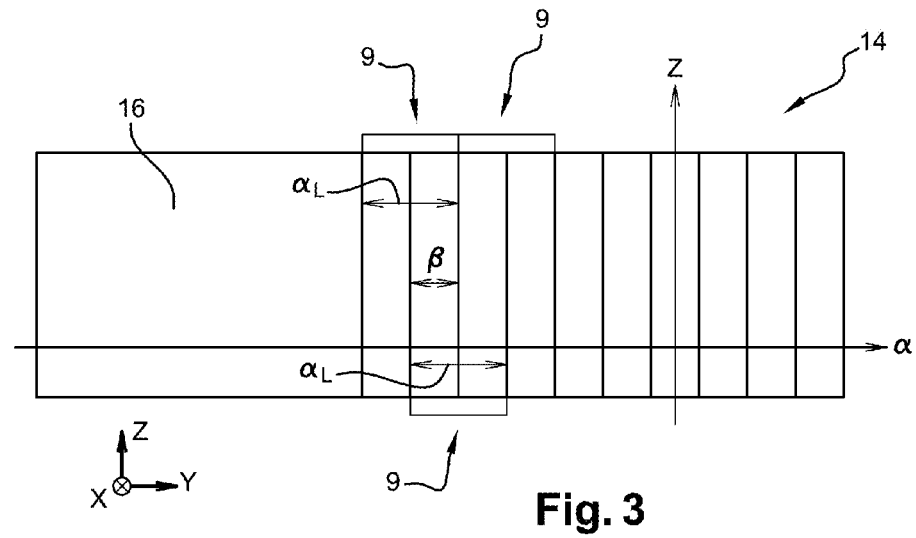
Figure 4:
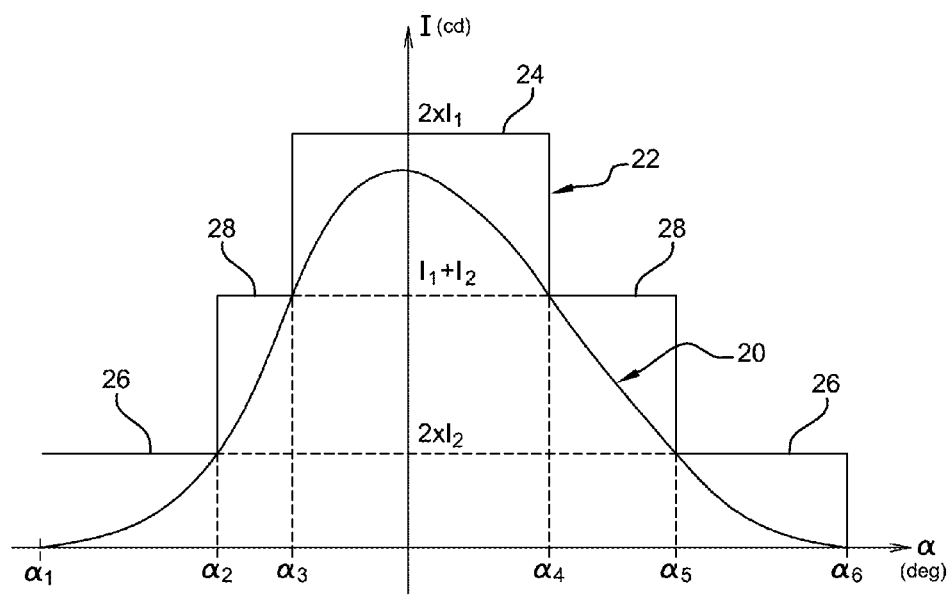
Figure 5:
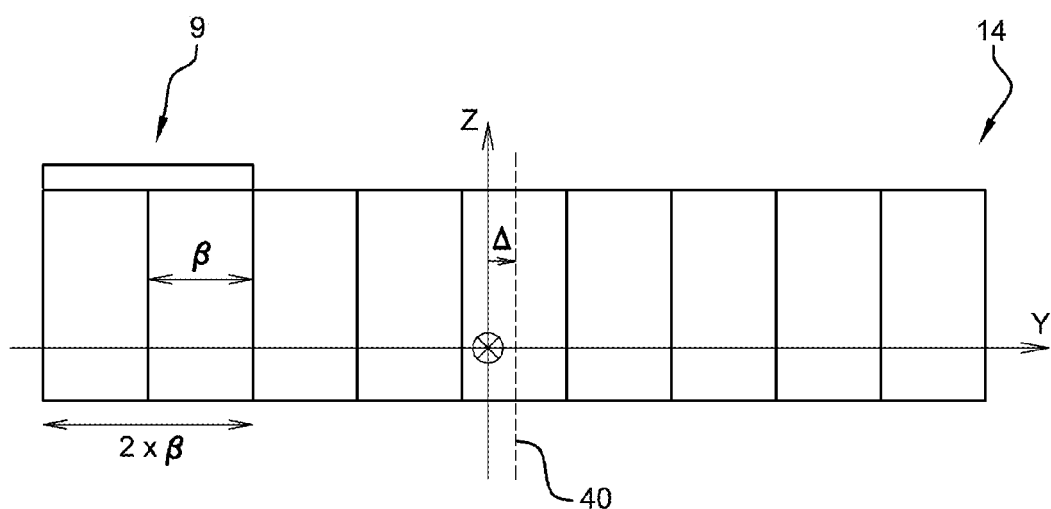

The invention will be better understood on reading the following description given by way of example and with reference to the drawings, in which:

FIG. 1 is a perspective view of a lighting system according to the invention,

FIG. 2 shows the light beam generated by the lighting system from FIG. 1, as it appears on a surface extending perpendicularly to the direction of movement of a vehicle in which the lighting system is mounted, FIG. 3 is a diagram showing the arrangement of light spots forming the light beam, FIG. 4 is a graph showing on the one hand the evolution of the intensity of the light beam as a function of the azimuth of said beam coinciding with the installed intensity profile necessary at the least for compliance with the specifications and on the other hand the ideal intensity profile imposed by the specifications to which the profile of the real beam must correspond as closely as possible, and FIG. 5 illustrates a parameter $\Delta$ of the lighting system from FIG. 1.

The following description employs an orthogonal frame of reference R (O, x, y, z) associated with a motor vehicle in which O is a point on the vehicle, x and y are coordinates along horizontal axes X and Y, respectively corresponding to the direction of movement of the vehicle and to the direction perpendicular to the latter, and z is a coordinate along the vertical axis Z.

FIG. 1 shows a lighting system 2 according to the invention mounted on a motor vehicle a part 3 of the bodywork of which is shown. The lighting system 2 forms the left-hand headlight of the vehicle and the lighting system has a principal axis substantially parallel to the direction X. The lighting system 2 includes at least two lighting modules 4 each including at least one light source 6 and optical means 8 adapted to form a light spot 9 from the light emitted by the light source 6. These lighting modules 4 are known in themselves. To produce lighting modules of this kind the person skilled in the art may refer to EP-2 278 217.

The system 2 includes at least two types of light source, termed first and second types of light source, the light sources 6 of the same type having substantially the same brightness. The light sources 6 of the first type are all laser diodes and the light sources 6 of the second type are all light-emitting diodes. As a result, the brightness of each light source 6 of the first type is 2 to 10 times greater than that of each light source 6 of the second type. To be more precise, the brightness of a light source 6 of the first type is 3 to 5 times greater than that of a light source 6 of the second type. However, light sources 6 different from those referred to above could be used. Thanks to the optical means 8, the light sources 6 of the same type form substantially identical light spots 9 so that it is possible to refer to spots 9 of a first type and spots of a second type. It will emerge hereinafter why it is beneficial for the lighting system 2 to include the two types of light source. The light sources 6 of the same lighting module 4 may be of the same type or both types. In the latter case, the module 4 is referred to as a hybrid module.

FIG. 2 shows a light beam 14 generated by the lighting system 2. The light beam 14 is formed by the combination of the light spots 9 generated by the lighting modules 4. Each light spot 9 has the general shape of a strip of light, notably of rectangular general shape. The light spots 9 are all substantially the same shape and substantially parallel to a common principal direction, which here is the vertical direction Z. The light beam 14 is divided into rectangular light strips 9. In order for it form a selective beam, that is to say a beam adapted not to illuminate some zones of the illuminated scene in front of the vehicle, the lighting system includes for this purpose conventional detection and control members (not shown in the figures). Those detection and control members are respectively adapted
- to detect zones of the scene in front of the vehicle that are not to be illuminated, and
- to control the light sources 6 in order to extinguish those forming the light spots 9 covering the zones that are not to be illuminated. This produces a so-called selective light beam 14.

As shown in FIG. 2, the beam 14 is completed by a beam in the shape of a ship's sail that provides ambient lighting.

Referring to FIG. 3, the light spots 9 of the light beam 14 are partly superposed. It is assumed here that all the light spots 9 are of rectangular general shape and of substantially identical size, the light spot edges being slightly blurred, and that the superposition is regular. This means that any spot 9 has a predetermined angular width, relative to the axis Z, $\alpha = \alpha_L$, usually defined as being substantially equal to the mid-height width of the intensity profile of the spot 9, ignoring the size of the blurring around the light spots 9, and that for any two adjacent light spots 9, the width of a region of superposition of those two adjacent spots 9 in the beam 14 has a predetermined fixed value. A superposition factor k is defined as being the value of $\alpha_L$ relative to the angular width of the region of superposition of two adjacent light spots 9. A superposition factor k is preferably chosen to be a non-zero natural integer and to be uniform along the axis Y.

Choosing an integer value of k strictly greater than 1 has the advantage of improving the resolution of the light beam 14, that is to say reducing the value of the parameter $\beta$. This parameter $\beta$ is defined by the width of the smallest zone of the beam 14 the extinction of which can be controlled by means of the control member. In other words, $\beta$ is equal to the angular width of a pixel of the light beam 14. If an integer value is chosen for k, the value of the parameter $\beta$ is equal to the value of $\alpha_L$ relative to the superposition factor k.

In the example shown in FIG. 3 two consecutive light spots 9 of the light beam 14 are superposed over half the angular width $\alpha_L$ of the light spots 9. In other words, k=2 and $\beta=\alpha_L/2$. For example, the situation k=1 would correspond to a situation in which the light spots 9 are contiguous.

The left-hand lateral edge of the light beam 14 is formed by an extended light spot 16. This has the particular feature of being the only spot that is a different shape than the other light spots 9, notably a different size. Although it has the same height as the other light spots 9, the extended spot 16 has a width greater than that of the other light spots 9 which, it will be remembered, have identical shapes and sizes. In FIG. 3, the extended light spot 16 is situated at the left-hand edge of the light beam 14.

The light beam 14 shown being that produced by the lighting system 2 equipping the left-hand headlight of the vehicle, the extended light spot 16 illuminates toward the outside relative to the direction X of movement of the vehicle, that is to say in the direction of vehicles that may be traveling in the opposite direction in an adjacent lane. Moreover, because it is formed by a light source of the second type the extended spot 16 has a moderate luminous intensity. This makes it possible to limit the contrast, in the sense that the transition of luminous intensity between the non-illuminated zone and the extended spot 16 is relatively gentle.

FIG. 4 shows a first contour 20 of an ideal intensity profile that is imposed and a second contour 22 of a real intensity profile of the light beam 14 that is produced when all the light sources 6 are supplied with power at their nominal current. The profiles 20, 22 represent the evolution of the luminous intensity as a function of the azimuth $\alpha$ corresponding to the angular width relative to the axis Z. These intensity profiles I are therefore measured along the axis Y. An objective of the invention is to produce the best possible match between the real profile 22 of the light beam 14 and the ideal profile 20.

The ideal profile 20 generally has the shape of a bell curve, but an ideal profile having any other shape could be imposed.

It will be remembered that here k also takes a value equal to 2.

The real profile 22 has the shape of a fragmented constant or stepped function. To be more precise, the real profile 22 includes a central step 24 of intensity $k \cdot I_1$, corresponding to the zone of the beam 14 generated by the light sources 6 of the first type. The real profile 22 also has two lateral steps 26 of intensity $k \cdot I_2$ corresponding to the zones of the beam 14 generated by the light sources 6 of the second type. Finally, the real profile 22 includes two intermediate steps 28 of intensity $k \cdot (I_1+I_2)/2$, each extending between the central step 24 and one of the two lateral steps 26. The intermediate steps 28 correspond to the so-called hybrid zones of the beam 14 in which the beam 14 consists of a regular alternation of spots 9 formed by sources of the first type and spots 9 formed by sources 8 of the second type. There could however be no intermediate steps 28, with the result that the central step 24 would be juxtaposed to the two lateral steps 26.

The values of $I_1$ and $I_2$ obviously depend on the brightness of the light sources 6 of the first and second types, but also on styling constraints of the specifications and therefore the size imposed for the optical means associated with each type of source. Thus reducing the size of the optical means 8 of the lighting modules 4 leads to a reduction in the luminous intensity of the light spots 9 that are formed. It goes without saying that in the context of the present invention all the sources of the same type have a substantially identical intensity I, ignoring manufacturing tolerances, resulting from a combination of the brightness defined for the type of source concerned with a given size of optical means that is homogeneous and that is the same for all the sources of one type. For reasons connected with styling choices, the size of the optical means for the two types of source may be the same or different.

The ideal profile 20 and real profile 22 as shown in FIG. 4 have common points that correspond to an optimum implementation of the real light beam 14. In fact, these points mark necessary and sufficient intensity thresholds short of which the steps 24, 26, 28 cannot be lowered further without the intensity of the beam 14 becoming locally insufficient. Moreover, the fact that the real profile 22 is at all points higher than or equal to the ideal profile 20 indicates compliance with the imposed specifications.

There will now be described in detail and with reference to the example that is being described the method of determining optimum numbers of light sources 6 of the first type and the second type as well as the sizes of the various steps 24, 26, 28, the ideal profile 20 being imposed and the size of the optical means associated with each type of source also being imposed.

The method described hereinafter aims to optimize the dimensions of the lighting system 2 by determining the minimum number of light sources 6 of the first type necessary for compliance with the specifications in order to minimize the cost and the installed power, that is to say the power available "in reserve" or potentially achievable that is obtained when all the sources are supplied with power at their nominal current. In some cases to simplify the lighting system 2 by limiting the number of different parts with a view to standardization of the modules 4 that it comprises it would be feasible to increase the ratio between the number of light sources 6 of high brightness and the number of light sources 6 of moderate brightness.

The calculation formulas have been established for a preferred embodiment in which the light strips 9 are superposed over half their angular width (in other words, k=2). A direct transposition of this method will enable the person skilled in the art to deal with situations in which k takes other values, for example 1 or 3.

The context is that of a standard profile shape required by the specifications, notably a bell curve. It will also be assumed here that the size of the optical means associated with a source type is homogeneous for the source type concerned.

The notation employed in FIGS. 4 and 5 is used hereinafter. A parameter $\Delta$ of the lighting system 2 is notably shown in FIG. 5. The parameter $\Delta$ is the distance between the axis Z and the center of the illuminating pixel on the axis of the lighting system. The center of the pixel is represented by a dashed line 40.

Hereinafter, [x] denotes the integer part of a real number x.

The angles $\alpha_1$ and $\alpha_6$ delimit the total extent of the zone of the light beam 14 to be covered by means of the light strips 9.

The angles $\alpha_2$ and $\alpha_5$ delimit the extent of the zone of the light beam 14 in which the intensity required by the specification is greater than $2I_2$. In this zone, $2I_2$ is not sufficient in terms of installed power for compliance with the specifications. An installed power of $I_1+I_2$ is therefore required.

The angles $\alpha_3$ and $\alpha_4$ delimit the extent of the zone of the light beam 14 in which the intensity required by the specifications is greater than $I_1+I_2$. In this zone, $I_1+I_2$ is insufficient in terms of installed power for compliance with the specifications. An installed power of $2I_1$ is therefore required.

The maximum value of the intensity of the ideal profile 20 defined by the specifications is denoted $I_{max}$.

Conditions of existence of the calculation formulas:

$\alpha_3 \leq 0 \leq \alpha_4$:

If this condition were not met, a change of frame of reference would be effected in order to achieve this.

$a_1 \leq a_2 \leq a_3$ and $\alpha_4 \leq \alpha_5$ for the hybrid zone
$\alpha_1 \leq \alpha_2$ and $\alpha_5$ $a_6$ for the LED zone
Case 1: $I_1+I_2 \leq I_{max} \leq 2I_1$ This case describes the existence of a zone of the light beam 14 formed entirely by light sources 6 of the first type.

Total number of sources of the second type.

The total number of light sources 6 of the second type is given by the sum of the number of sources of the second type in the zone of the light beam formed entirely by sources of the second type and the number of sources of the second type in the hybrid zone.

Number of sources of the second type in the zone formed entirely by sources of the second type:

$$\left[\frac{\frac{\beta}{2}+\Delta-a_1}{\beta}\right]-\left[\frac{\frac{\beta}{2}+\Delta-a_2}{\beta}\right]-1+\left[\frac{a_6-\frac{\beta}{2}-\Delta}{\beta}\right]-\left[\frac{a_5-\frac{\beta}{2}-\Delta}{\beta}\right]-1$$

Number of sources of the second type on a first side of the hybrid zone:
If the number of pixels between $\alpha_2$ and $\alpha_3$ is even:

$$1+\frac{1}{2}\left(\left[\frac{\frac{\beta}{2}+\Delta-\alpha_2}{\beta}\right]-\left[\frac{\frac{\beta}{2}+\Delta-\alpha_3}{\beta}\right]-1\right)$$

If the number of pixels between $\alpha_2$ and $\alpha_3$ is odd:

$$\frac{1}{2}\left(\left[\frac{\frac{\beta}{2}+\Delta-a_2}{\beta}\right]-\left[\frac{\frac{\beta}{2}+\Delta-a_3}{\beta}\right]\right)$$

Number of sources of the second type on a second side of the hybrid zone:

If the number of pixels between $\alpha_5$ an $\alpha_6$ is even:

$$1+\frac{1}{2}\left(\left[\frac{\frac{\beta}{2}+\Delta-\alpha_5}{\beta}\right]-\left[\frac{\frac{\beta}{2}+\Delta-\alpha_6}{\beta}\right]-1\right)$$

If the number of pixels between $\alpha_5$ and $\alpha_6$ is odd:

$$\frac{1}{2}\left(\left[\frac{\frac{\beta}{2}+\Delta-\alpha_5}{\beta}\right]-\left[\frac{\frac{\beta}{2}+\Delta-\alpha_6}{\beta}\right]\right)$$

Total number of sources of the first type.

The total number of light sources 6 of the first type is given by the sum of the number of sources of the first type in the zone formed entirely by sources of the first type and the number of sources of the first type in the hybrid zone.

Number of sources of the first type in the zone formed entirely by sources of the first type:

$$\left[\frac{\frac{\beta}{2}+\Delta-\alpha_3}{\beta}\right]-\left[\frac{\alpha_4-\frac{\beta}{2}-\Delta}{\beta}\right]+1$$

Number of sources of the first type on a first side of the hybrid zone:
If the number of pixels between $\alpha_2$ and $\alpha_3$ is even:

$$\frac{1}{2}\left(\left[\frac{\frac{\beta}{2}+\Delta-\alpha_2}{\beta}\right]-\left[\frac{\frac{\beta}{2}+\Delta-\alpha_3}{\beta}\right]\right)$$

If the number of pixels between $\alpha_2$ and $\alpha_3$ is odd:

$$\frac{1}{2}\left(\left[\frac{\frac{\beta}{2}+\Delta-\alpha_2}{\beta}\right]-\left[\frac{\frac{\beta}{2}+\Delta-\alpha_3}{\beta}\right]-1\right)$$

Number of sources of the first type on a second side of the hybrid zone:
If the number of pixels between $\alpha_5$ and $\alpha_6$ is even:

$$\frac{1}{2}\left(\left[\frac{\frac{\beta}{2}+\Delta-\alpha_5}{\beta}\right]-\left[\frac{\frac{\beta}{2}+\Delta-\alpha_6}{\beta}\right]\right)$$

If the number of pixels between $\alpha_5$ and $\alpha_6$ is odd:

$$\frac{1}{2}\left(\left[\frac{\frac{\beta}{2}+\Delta-\alpha_5}{\beta}\right]-\left[\frac{\frac{\beta}{2}+\Delta-\alpha_6}{\beta}\right]-1\right)$$

Case 2: $2I_2 \leq I_{max} \leq I_1+I_2$
This case describes the absence of a zone of the light beam 14 formed entirely by light sources 6 of the first type.
Total number of sources of the second type.
The total number of light sources 6 of the second type is given by the sum of the number of sources of the second type in the zone formed entirely by sources of the second type and the number of sources of the second type in the hybrid zone.

Number of LED in the 100% LED zone:

$$\left\lfloor \frac{\frac{\beta}{2}+\Delta-\alpha_1}{\beta}\right\rfloor - \left\lfloor \frac{\frac{\beta}{2}+\Delta-\alpha_2}{\beta}\right\rfloor - 1 + \left\lfloor \frac{\alpha_6-\frac{\beta}{2}-\Delta}{\beta}\right\rfloor - \left\lfloor \frac{\alpha_5-\frac{\beta}{2}-\Delta}{\beta}\right\rfloor - 1$$

Number of sources of the second type in the hybrid zone:
If the number of pixels between $\alpha_2$ and $\alpha_5$ is even:

$$1 + \frac{1}{2}\left(\left\lfloor \frac{\frac{\beta}{2}+\Delta-\alpha_2}{\beta}\right\rfloor + \left\lfloor \frac{\alpha_5-\frac{\beta}{2}-\Delta}{\beta}\right\rfloor\right)$$

If the number of pixels between $\alpha_2$ and $\alpha_5$ is odd:

$$\frac{1}{2}\left(\left\lfloor \frac{\frac{\beta}{2}+\Delta-\alpha_2}{\beta}\right\rfloor + \left\lfloor \frac{\alpha_5-\frac{\beta}{2}-\Delta}{\beta}\right\rfloor - 1\right)$$

Total number of sources of the first type.

The total number of light sources 6 of the first type is given by the number of sources of the first type in the hybrid zone.

Number of sources of the first type in the hybrid zone:
If the number of pixels between $\alpha_2$ and $\alpha_5$ is even:

$$\frac{1}{2}\left(\left\lfloor \frac{\frac{\beta}{2}+\Delta-\alpha_2}{\beta}\right\rfloor + \left\lfloor \frac{\alpha_5-\frac{\beta}{2}-\Delta}{\beta}\right\rfloor\right)$$

If the number of pixels between $\alpha_2$ and $\alpha_5$ is odd:

$$1 + \frac{1}{2}\left(\left\lfloor \frac{\frac{\beta}{2}+\Delta-\alpha_2}{\beta}\right\rfloor + \left\lfloor \frac{\alpha_5-\frac{\beta}{2}-\Delta}{\beta}\right\rfloor - 1\right)$$

The ratio obtained between the numbers of sources of the first and second types makes it possible to optimize the usable power of the lighting system, that is to say the power necessary for compliance with the performance specifications. In other words, the powers in the various modules are varied in order to "move" the real profile 22 toward the intensity profile 20 stated in the specifications.

It will be noted that the finer the discretization of the light beam 14, that is to say the smaller the values of $\beta$ and $\alpha_L$, the closer the efficiency of use of the lighting system 2 will approach 1 and the greater the degree to which the lighting system 2 will be optimized. Optimization is also increased if the number of different types of modules available is large.

A nonlimiting embodiment of the invention will now be described to show that the lighting system of the invention is particularly optimized. The hypotheses of this embodiment are as follows:
the lighting system comprises ten modules,
the dimensions of the optical means (and therefore those of the modules) are imposed and are such that the exclusive use of light sources of the first type does not make it possible to comply with the specifications in terms of performance, that is to say to match the profile 22 of the light beam 14 to the imposed ideal profile 20, and
at the exit of a module of the first type, comprising only sources of the first type, if its light sources 6 are supplied with power at their nominal current the luminous intensity is 35% of that produced by a module of the second type comprising only sources of the second type when its light sources 6 are supplied with power at their nominal current.

If the choice made is that all the modules are of the first type, that is to say that they all include a light source of the first type, it is assumed that the best power supply current of the sources relative to the nominal current is as follows: 20%, 37%, 100%, 100%, 100%, 80%, 50%, 34%, 15% and 19%, the last source supplied with power at 19% forming a ship's sail shaped ambient lighting spot. In this case the efficiency of use, which it will be remembered is defined as being the useful power relative to the installed power, takes the value 56%.

If there is instead chosen for the lighting system of the invention the method of determination of the numbers of light sources 6 of the first and second types, this leads to adopting the following configuration:
source 1: type 2, powered at 60% of the nominal current,
source 2: type 2, powered at 100% of the nominal current,
source 3: type 1, powered at 100% of the nominal current,
source 4: type 1, powered at 100% of the nominal current,
source 5: type 1, powered at 100% of the nominal current,
source 6: type 1, powered at 80% of the nominal current,
source 7: type 1, powered at 50% of the nominal current,
source 8: type 1, powered at 35% of the nominal current,
source 9: type 2, powered at 40% of the nominal current,
source 10 (to produce a ship's sail shape ambient lighting spot): type 2, powered at 60% of the nominal current.

In this case, the efficiency of use is equal to 74%. It is therefore seen that the efficiency of use is considerably increased by changing from the first configuration to the second configuration. In other words, the installed power of the lighting system is used more optimally.

Of course, numerous modifications could be made to the invention without departing from the scope thereof.

The invention claimed is:

1. A motor vehicle lighting system emitting a light beam, the system comprising:
at least first and second types of light sources, each light source configured to produce a corresponding illumination output, the light sources of the same type having substantially the same brightness; and
optical means configured to receive the illumination output from the light sources and project a corresponding plurality of rectangularly-shaped light spots,
wherein the brightness of a light source of the first type is 2 to 10 times greater than that of a light source of the second type, and
wherein the light spots are all of substantially identical shape and are formed substantially parallel to each other in a common principal direction.

2. The lighting system according to claim 1, wherein the beam includes at least one zone in which it consists of a regular alternation of spots formed by sources of the first type and spots formed by sources of the second type.

3. The lighting system according to claim 1, wherein the light sources of the first type are laser diodes.

4. The lighting system according to claim 1, wherein the light sources of the second type are light-emitting diodes.

5. The lighting system according to claim 1, wherein the beam includes, at one of its two lateral edges at least, an extended light spot of greater width than the other light spots.

6. The lighting system according to claim 1, wherein the light sources of the first type are laser diodes.

7. The lighting system according to claim 1, wherein the light sources of the second type are light-emitting diodes.

8. The lighting system according to claim 1, wherein the beam includes, at one of its two lateral edges at least, an extended light spot of greater width than the other light spots.

9. The lighting system as according to claim 1, wherein the brightness of a light source of the first type is 3 to 5 times greater than that of a light source of the second type.

10. The lighting system according to claim 9, wherein the light spots are all of substantially identical shape and substantially parallel to a common principal direction.

11. The lighting system according to claim 9, wherein the light sources of the first type are laser diodes.

12. The lighting system according to claim 9, wherein the light sources of the second type are light-emitting diodes.

13. The lighting system according to claim 9, wherein the beam includes, at one of its two lateral edges at least, an extended light spot of greater width than the other light spots.

14. The lighting system according to claim 1, wherein the light spots are partly superposed.

15. The lighting system according to claim 14, wherein the beam includes at least one zone in which it consists of a regular alternation of spots formed by sources of the first type and spots formed by sources of the second type.

16. The lighting system according to claim 14, wherein the light sources of the first type are laser diodes.

17. The lighting system according to claim 14, wherein the light sources of the second type are light-emitting diodes.

18. The lighting system according to claim 14, wherein two consecutive light spots of the light beam are superposed over half the width of the light spots.

19. The lighting system according to claim 18, wherein the beam includes at least one zone in which it consists of a regular alternation of spots formed by sources of the first type and spots formed by sources of the second type.

* * * * *